United States Patent Office 3,159,642
Patented Dec. 1, 1964

3,159,642
PROCESS FOR PURIFICATION OF BIPYRIDYL
Ralph Santorre Fanshawe, Widnes, England, assignor to Imperial Chemical Industries Limited, London, England, a corporation of Great Britain
No Drawing. Filed Feb. 25, 1963, Ser. No. 260,883
Claims priority, application Great Britain Feb. 27, 1962
17 Claims. (Cl. 260—296)

This invention relates to a process for the purification of organic bases, and more particularly for the purification of bipyridyls.

Bipyridyls are useful intermediates for the manufacture of herbicidal materials, and are commonly made from pyridine by reactions involving oxidation or dehydrogenation. The products of such reactions are usually found to be mixtures made up of various isomeric bipyridyls, the relative proportions of which depend upon the particular reaction conditions employed, in admixture with varying proportions of higher polypyridyls and tarry and highly coloured by-products.

Separation of such products is usually carried out by physical methods, for example fractional distillation, but this is a slow, expensive and inefficient operation on account of the relatively high boiling points of the bipyridyls and the close chemical similarity of the components of the mixtures.

It has now been found that there is an unexpected difference in the behaviour of the components of this mixture in a system consisting of water and a substantially water-immiscible organic solvent, and that this difference can be used very effectively for purifying the bipyridyls. The bipyridyls dissolve preferentially in the organic solvent phase, but the highly coloured tarry materials and by-products are preferentially dissolved in the aqueous phase. This observation is very surprising, for tarry materials and by-products are commonly found to be much more soluble in organic solvents than in water.

Thus according to this invention there is provided in a process for the purification of bipyridyls, the steps of contacting an impure bipyridyl with water and a substantially water-immiscible organic solvent and thereafter separating the organic solvent phase, which contains the bipyridyl.

The contacting step is preferably carried out so as to promote intimate contact of the various phases of the mixture and to bring the system rapidly towards the equilibrium compositions for the phases. Conventional means for liquid/liquid extraction may be used for this purpose, for example thorough agitation which may be produced by mixers, stirrers, agitators or any other convenient device. The separation step may also be carried out by any convenient conventional technique, for example by settling, decantation, centrifugal separators, or the like.

In a simple embodiment of the invention, the impure bipyridyls are mixed with water and the organic solvent and the mixture is agitated, preferably until the system reaches substantially complete equilibrium between the phases, and then the organic solvent phase is separated. The aqueous phase contains most of the tarry and highly coloured impurities and can be discarded, while the organic solvent phase contains most of the bipyridyls. There may be some interference with the separation of the liquid phases owing to the presence of solid phases, though this can be reduced very considerably by carrying out the operation at a temperature above the melting point of any solid organic phase which may be present in the mixture, or by filtering the mixture. In order to recover the small proportions of bipyridyl remaining in the aqueous phase and so increase the efficiency of the process, the aqueous phase may be extracted with further quantities of the organic solvent.

A preferred method for carrying out the invention is that in which the bipyridyls are first dissolved in one or other of the two liquid phases (i.e. the water or the organic solvent) before contacting these with each other. As the crude bipyridyls may conveniently be recovered as an aqueous acid solution from the reaction mixture in which they are formed, this aqueous acid solution may be neutralised by addition of alkali and contacted with the organic solvent. If desired, however, the crude bipyridyls may be dissolved in the organic solvent, filtered if necessary to remove undissolved or insoluble impurities, and then the resulting solution may be contacted with water.

The process of the present invention is preferably carried out using an aqueous phase which is substantially neutral and in particular with an aqueous phase having a pH in the range 4 to 8. Formation of bipyridyl salts in more acid solutions can reduce the extent to which the bipyridyls are taken up by the organic solvent or retained in it, and the precipitation from more alkaline solutions of insoluble metal hydroxides (for example magnesium hydroxide) and of tars which may be difficult to redissolve can interfere considerably with the separation of the liquid phases. The pH of the aqueous phase during the contacting (i.e. extraction) step is therefore an important economic factor. For most satisfactory operation it is preferred to use an aqueous phase having a pH in the range 4.6 to 6.5. During the contacting (i.e. extraction) stage, the pH of an aqueous acid solution of bipyridyls will tend to fall owing to dissociation of bipyridly salts into bipyridyl (which passes into the organic solvent phase) and free acid (which is retained in the aqueous phase). To deal with such a tendency for the pH to change, acording to the invention it has been found advantageous to control the pH and to maintain it in the desired range during the course of our process. This may be done by buffering the aqueous phase at the optimum pH, for example using a sodium formate/formic acid buffer, or by appropriate addition of an alkali or other material which can remove acid during the course of the process. Provided that the initial concentration of bipyridyl salts is not too high, the change in pH may not tend to go beyond the required limits and so can be tolerated.

The process can also be adapted advantageously for a continuous operation. In particular, the aqueous and organic solvent phases can be contacted intimately in conventional continuous extraction apparatus, for example in towers in which the two liquid phases are thoroughly contacted with each other, for example by flowing counter current to each other. This continuous operation has the advantage that the efficiency of the recovery of bipyridyls can be improved, and can be made substantially quantitative. Continuous extraction techniques have the advantage of minimum equipment cost and permitting easy control of the pH by continuous or intermittent injection of alkali into the aqueous stream, particularly when more than one pass through the extractor is made.

By passing the solvent containing bipyridyls to a boiler and distilling off solvent for re-use and recirculation through the process, an economical use of the solvent can be secured and the bipyridyls can be recovered as a solution of any desired concentration in the solvent.

The continuous extraction technique also has the advantage that it can be operated at lower temperatures than the batchwise extraction technique. The tendency of 4:4'-bipyridyl to form a solid hydrate can interfere with its extraction into the organic solvent phase, but repeated extraction can overcome this and ultimately remove all the 4:4'-bipyridyl from the aqueous phase.

The process may be carried out at a variety of temperatures, and preferably at a temperature in the range 40° C. to 80° C. Higher temperatures may lead to troubles from excessive evaporation, and lower temperatures tend to make the process less rapid or efficient so that more organic solvent or prolonged or repeated extraction is necessary for the best recovery of purified product. In the case of a batchwise process it is preferred to operate at a temperature above about 60° C. in order to avoid complications caused by 4:4'-bipyridyl separating out as a solid hydrate; in a continuous process, as indicated above, the repeated extraction can take all the bipyridyl into solution in the organic solvent phase at lower temperatures, though it is preferred to use a temperature not lower than 30° C.

The aqueous phase from the process contains inorganic salts, tars, and colouring matter derived from the impure bipyridyl, and can be discharged to waste. Provided that the partition process has been repeated at least once, by extracting the waste aqueous phase with fresh solvent, the loss of bipyridyls in the aqueous phase is not significant.

The organic solvent may be any organic solvent which is substantially immiscible with water and in which the bipyridyl can dissolve. A wide range of solvents is suitable, and there may be mentioned in particular hydrocarbons for example benzene, toluene, xylenes, trimethyl benzenes, petroleum spirit and other petroleum fractions, and clorinated hydrocarbons for example carbon tetrachloride, chloroform, trichloroethylene and tetrachloroethylene, and mixtures thereof. Chlorinated hydrocarbon solvents are to be preferred on account of their freedom from inflammability, but the less polar solvents (for example hydrocarbons) are to be preferred on account of their ability to reject the coloured impurities more completely into the aqueous phase so that the organic solvent phase is only very slightly coloured. Even the more polar solvents produce a very valuable separation of bipyridyls from impurities, however, for the proportion of coloured imprities remaining dissolved in them is only very small compared with that rejected into the aqueous phase. The choice of solvent thus depends upon a combination of several factors, for example the cost and physical properties of the solvent, the degree of inflammability or toxic hazard which can be accepted, and the final degree of purification required. Trichloroethylene and toluene are especially suitable on account of their ready availability in commerce, their convenient boiling point, general overall efficiency, and freedom from chronic toxic hazard.

The recovery of the purified bipyridyls from the organic solvent can be effected very simply by evaporation or distillation, by addition of an acid which forms bipyridyl salts which are sufficiently insoluble to be precipitated from the organic solvent, by extraction of the bipyridyl from the solvent by aqueous acid (for example hydrochloric acid) and precipitation of the free bipyridyls from the resulting acid extract by addition of excess alkali, or by combinations of such techniques. It is not necessary to isolate the bipyridyls as such, however, and they can be recovered as a solution of any desired concentration, or as a salt or other derivative, and may be used or stored in any of these forms if desired. In particular, the solution of bipyridyls can ve converted directly to quaternary salts by treatment with methyl chloride, methyl sulphate, or any other desired quaternising agent, or converted to other derivatives by treatment with appropriate reagents. Solvent from which bipyridyls have been removed can be re-cycled to the process if desired, for economy.

The purified bipyridyl product, though substantially freed from inorganic and tarry impurities, can contain the various isomeric bipyridyls mixed together, and the relative proportions of these will depend upon the proportions present in the original crude bipyridyl used.

These isomers may be separated in known manner if desired, or used as a mixture.

A very convenient method of separating the 4:4'-bipyridyl is that described in copending U.S. application, Serial No. 260,882, filed February 25, 1963, in which the mixture of bipyridyls is treated with water under conditions whereby the hydrate of 4:4'-bipyridyl is formed, and this hydrate is separated and recovered. This process can be advantageously be applied by adding water to the solution of the mixed bipyridyls in the organic solvent resulting from the process of the present invention. It is preferred that the proportion of water should be about 1 to 20 times the weight of the 4:4'-bipyridyl present, as lesser amounts tend to give incomplete hydrate formation and larger amounts tend to cause losses and inconvenience due to excessive bulk. Also, the temperature should be below 60° C., and preferably between 0° C. and 30° C. to give optimum recovery of the hydrate, which may be recovered by filtration to remove the aqueous and solvent phases together with dissolved isomeric bipyridyls. The bipyridyl isomers remaining dissolved, and containing usually the 2:2'- and 2:4'-isomers and a small proportion of the 4:4'-isomers, can be recovered in the manner discussed above.

The invention is illustrated but not limited by the following examples in which the parts and percentages are by weight.

Example 1

An oxidised magnesium-pyridine interaction product, containing 4:4'-bipyridyl with small proportions of isomeric bipyridyls, was distilled with half its weight of a petroleum distillate (boiling range approximately 170–200° C.) until any pyridine present had been distilled off. The still residue was then extracted with aqueous 20% hydrochloric acid until the pH of the acid extract was 2 or less. The aqueous acid extract was then neutralised to a pH between 7 and 8 by addition of aqueous 40% caustic soda solution, and the neutralised liquor was extracted with trichloroethylene at 55–65° C. in a continuous extraction apparatus in which solvent from a boiler was condensed, allowed to pass through the neutral aqueous liquor and then passed back to the boiler. Extraction was continued for 2 hours. The resulting trichloroethylene extract in the boiler was found by analysis to contain approximately 5.4% of 4:4'-bipyridyl, and the amount of 4:4'-bipyridyl present in the entire trichloroethylene extract represented a substantially complete recovery of amount of 4:4'-bipyridyl estimated by analysis to be present in the original oxidised magnesium-pyridine interaction product.

The aqueous phase was very dark in colour, and contained substantially all the tars and coloured impurities; the trichloroethylene solution was very much lighter in colour and contained only a very small proportion of coloured impurity.

Repetition of the procedure of this example, using trimethyl benzene in place of the petroleum distillate, gave substantially the same results.

Example 2

The procedure of Example 1 was repeated using 466 parts of an oxidised magnesium-pyridine interaction product, containing approximately 58.8 parts of 4:4'-bipyridyl. The trichloroethylene extract, which weighed 500 parts, was cooled to 20° C. and mixed with 150 parts of water and stirred. The crystalline product which separated was collected by filtration and was found by analysis to contain 47 parts of 4:4'-bipyridyl in the form of its hydrate, representing a recovery of 80%.

Example 3

An acidic aqueous liquor (2000 ml.) was produced, in the manner described in the first part of Example 1, from an oxidised magnesium-pyridine interaction product estimated by analysis to contain 160 grams of 4:4'-bipyridyl. This aqueous liquor was divided into five portions, each of 400 ml., which were treated as follows:

One 400 ml. portion was neutralised to pH 8 with 40% caustic soda solution and was continuously extracted with 200 ml. of trichloroethylene at 55–65° C. This trichloroethylene extract was separated, cooled to 20° C., and treated with 100 ml. of water, and the crystalline 4:4'-bipyridyl hydrate which formed was separated from the water and trichloroethylene by filtration. A second 400 ml. portion of the acid liquor was then neutralised in similar manner, mixed with the aqueous portion of the filtrate from the crystalline hydrate, and extracted at 55–65° C. using the trichloroethylene portion of the filtrate from the crystalline hydrate. 4:4'-bipyridyl hydrate was recovered from the trichloroethylene extract by treatment with water as described above. The trichloroethylene was recycled for treatment of the remaining portions of acidic aqueous liquor successively in similar manner.

The following table shows the recovery of bipyridyls, as determined by analysis, in the five successive extracting stages.

| Extraction | 1 | 2 | 3 | 4 | 5 |
|---|---|---|---|---|---|
| Volume of acid liquor extracted (ml.) | 400 | 400 | 400 | 400 | 400 |
| Weight of wet hydrate (A) (g.) | 41 | 51 | 58 | 62 | 61.5 |
| Percent 4:4'-bipyridyl in (A) (%) | 68.4 | 73.3 | 58.4 | 56.2 | 65 |
| 4:4'-bipyridyl recovered (g.) | 28 | 37.2 | 33.8 | 34.8 | 40 |
| Melting point (after drying) (° C.) | 112 | | | | 109 |

The melting point of pure 4:4'-bipyridyl is 112° C.

This represents a total recovery of 173.8 g. of 4:4'-bipyridyl. Within the limits of accuracy of the analytical methods used, this represents a substantially complete recovery of the 4:4'-bipyridyl present in the materials used:

The 4:4'-bipyridyl hydrate was colourless and free from any significant impurities.

*Example 4*

An acidic aqueous liquor was produced by extraction of an oxidised magnesium-pyridine interaction product with hydrochloric acid. The amount taken (150 lb.) was estimated by analysis to contain 13.4 lb. of 4:4'-bipyridyl. This liquor was neutralised to pH 5.25 by addition of an aqueous 35% solution of sodium hydroxide and buffered at this pH by addition of a sodium acetate/acetic acid buffer (11 lb.), and then continuously extracted for 12 hours with trichloroethylene (90 lb.) at 60° to 70° C.

The trichloroethylene extract was separated, cooled to 10° C., and treated with water (60 lb.) with stirring. The crystalline 4:4'-bipyridyl hydrate which formed was then separated from the water-trichloroethylene mixture by filtration. The solid was practically white and weighed 30 lb. and, on drying, yielded 13.6 lb. of 4:4'-bipyridyl. Within the accuracy of plant-scale measurements and the analytical methods used, this represents a substantially complete recovery of the 4:4'-bipyridyl.

What is claimed is:

1. A process for the purification of a bipyridyl which comprises the steps of contacting an impure bipyridyl with an aqueous phase having a pH in the range of about 4.0 to about 8.0, and with a substantially water-immiscible organic solvent phase, and thereafter separating the organic solvent phase, which contains the bipyridyl.

2. A process for the separation of 4:4'-bipyridyl and isomers thereof from a reaction mixture containing the same with tars and colored impurities, which comprises the steps of contacting the reaction mixture with an aqueous phase having a pH in the range of about 4.0 to about 8.0 and with a substantially water-immiscible organic solvent phase, such that the 4:4'-bipyridyl and bipyridyl isomers are retained by the organic solvent phase while the tars and other impurities are rejected from the organic solvent phase and accepted by the aqueous phase, and thereafter separating the two phases.

3. Process as claimed in claim 1 wherein the impure bipyridyl is first dissolved in one of the two liquid phases before these are contacted with each other.

4. Process as claimed in claim 3 wherein the impure bipyridyl is introduced as an aqueous acid extract of the reaction mixture in which it is formed.

5. Process as claimed in claim 1 wherein there is used an aqueous phase which is substantially neutral.

6. Process as claimed in claim 5 wherein the aqueous phase has a pH in the range of about 4.6 to 6.5.

7. Process as claimed in claim 1 wherein the organic solvent is a hydrocarbon.

8. Process as claimed in claim 7 wherein the organic solvent is toluene.

9. Process as claimed in claim 1 wherein the organic solvent is a chlorinated hydrocarbon.

10. Process as claimed in claim 9 wherein the organic solvent is trichloroethylene.

11. Process as claimed in claim 1 wherein the contacting step is carried out so as to promote intimate contact of the various phases of the mixture and to bring the system rapidly towards the equilibrium compositions for the phases.

12. Process as claimed in claim 1 wherein the contacting is carried out by continuous counter-current extraction of the bipyridyl from the aqueous phase into the organic solvent phase.

13. Process as claimed in claim 1 wherein the contacting is carried out at a temperature not less than 30° C.

14. The process of claim 13 wherein the contacting is carried out at a temperature above 60° C.

15. Process as claimed in claim 13 wherein the contacting step is carried out at a temperature in the range 40° C. to 80° C.

16. Process as claimed in claim 1 wherein, after separation of the organic solvent phase, the residual aqueous phase is further extracted with fresh organic solvent.

17. Process as claimed in claim 1 wherein the organic solvent phase from the separation step is treated with water at a temperature below 60° C. and 4:4'-bipyridyl hydrate is recovered therefrom.

References Cited in the file of this patent

Smith: JACS, vol. 46, pp. 414–419 (1924).
Beilstein: "Handbuch der Organischen Chemie" Vierte Auflage (4th Ed.) Band (vol.) XXIII H. W. pp. 199–201 I Supp. p. 49, II Supp. pp. 211–13 (Springer) (1936).